(12) United States Patent
Mitryukhin et al.

(10) Patent No.: US 12,198,823 B2
(45) Date of Patent: Jan. 14, 2025

(54) ECCS WITH SELF-CLEANING FILTER SYSTEM

(71) Applicants: JOINT-STOCK COMPANY "ATOMENERGOPROEKT", Moscow (RU); SCIENCE AND INNOVATIONS-NUCLEAR INDUSTRY SCIENTIFIC DEVELOPMENT, PRIVATE ENTERPRISE, Moscow (RU)

(72) Inventors: Andrey Gennadievich Mitryukhin, Saint Petersburg (RU); Leonid Aleksandrovich Matyushev, Saint Petersburg (RU); Maksim Anatolyevich Drobyshevskiy, Saint Petersburg (RU); Yevgeniya Leonidovna Shamray, St. Petersburg (RU)

(73) Assignees: JOINT STOCK COMPANY "ATOMENERGOPROEKT", Moscow (RU); SCIENCE AND INNOVATIONS—NUCLEAR INDUSTRY SCIENTIFIC DEVELOPMENT, PRIVATE ENTERPRISE, Moscow (RU)

( * ) Notice: Subject to any disclaimer, the term of this patent is extended or adjusted under 35 U.S.C. 154(b) by 0 days.

(21) Appl. No.: 17/619,120

(22) PCT Filed: Apr. 30, 2020

(86) PCT No.: PCT/RU2020/000207
§ 371 (c)(1),
(2) Date: Apr. 10, 2024

(87) PCT Pub. No.: WO2021/137717
PCT Pub. Date: Jul. 8, 2021

(65) Prior Publication Data
US 2023/0215589 A1 Jul. 6, 2023

(30) Foreign Application Priority Data

Dec. 30, 2019 (RU) .......................... RU2019145008

(51) Int. Cl.
*G21D 1/02* (2006.01)
*G21C 15/18* (2006.01)

(52) U.S. Cl.
CPC .............. *G21D 1/02* (2013.01); *G21C 15/18* (2013.01)

(58) Field of Classification Search
CPC ......... G21C 15/182; G21C 15/18; G21D 1/02
See application file for complete search history.

(56) References Cited

U.S. PATENT DOCUMENTS 3,649,451 A * 3/1972 Yedidia ................ G21C 9/004
376/280
5,815,544 A * 9/1998 Lefter .................. B01D 33/463
210/408

(Continued)

FOREIGN PATENT DOCUMENTS

FR 2914102 A1 * 9/2008 ............. G21C 3/352
GB 2522822 A * 8/2015 ........... B01D 35/027

OTHER PUBLICATIONS

Park, Jong Woon. "A study on the performance of a nuclear reactor building floor baffle for particulate debris sedimentation." Nuclear engineering and design 241.12 (2011): 5064-5078. (Year: 2011).*

*Primary Examiner* — Sharon M Davis
(74) *Attorney, Agent, or Firm* — J. Miguel Hernandez; James R. Gourley; Carstens, Allen & Gourley, LLP (57) ABSTRACT

The invention relates to a self-cleaning liquid purification system and is designed for the use in sump tank filters in nuclear power plants, as well as in any submersible filters used in any sectors of the economy. A self-cleaning liquid purification system comprises a filtration unit with filtering (Continued)

elements, a clean liquid discharge pipe, and an aerator. The aerator is designed as an intake device located on the liquid-gas boundary in a source of liquid to be purified, the aerator is capable of forming a liquid-gas mixture when it enters the intake device. The aerator is connected with a vertical downcomer to an accumulation chamber that is connected to the filtration unit by a hydraulic lock that is designed to be capable of pulse feed of liquid-gas mixture. The technical result is improved operation reliability of the liquid purification system through ensuring its capability of self-cleaning in the passive mode.

5 Claims, 5 Drawing Sheets

(56) References Cited

U.S. PATENT DOCUMENTS

| | | | | |
|---|---|---|---|---|
| 2006/0219645 | A1* | 10/2006 | Bilanin | B01D 29/86 |
| | | | | 210/791 |
| 2014/0010340 | A1* | 1/2014 | Nilsson | G21C 19/303 |
| | | | | 376/314 |
| 2018/0350472 | A1* | 12/2018 | Fu | G21C 15/182 |
| 2019/0221323 | A1* | 7/2019 | Bilanin | B01D 29/00 |

* cited by examiner

ECCS WITH SELF-CLEANING FILTER SYSTEM

FIELD OF THE INVENTION

The invention relates to nuclear power engineering and to filtering devices with the capability of self-cleaning and is designed mainly for the use in nuclear power plants (NPP) in sump tank filters and any submersible filters used in any sectors of the economy.

PRIOR ART

The important problem when using the filtering devices for cleanup of any liquid is the clogging of filtering elements with foreign matter present in the liquid being cleaned up that creates the necessity of operation shutdown of such a device for cleanup of the filtering elements. This problem is particularly important in the nuclear sector when using the filters of the sump tanks of the emergency core cooling system (ECCS) of nuclear reactors of nuclear power plants (NPP) since in the event of a serious accident a large amount of foreign matter generated following the accident gets into the sump tank together with a liquid (water or boric acid solution), for example, following an accident in one of the NPP pipelines.

The essential requirement which is presented to the emergency protection system in the process of designing, analysis and operation of the reactor is that it must ensure safety in case of a loss of coolant accident (maximum design basis accident). Any unexpected loss of the coolant flow through the reactor core may lead to serious consequences for a nuclear power plant as a whole, since a meltdown may occur amid the lack of sufficient. The flow may be lost as a result of a coolant pump or a valve failure or following a break of the main pipeline at the inlet to or outlet from the reactor pressure vessel.

Coolant leakage takes place during the accident. This coolant may carry solid foreign debris from the breakdown of thermal insulation of the piping nearby or other reactor structures. In this case, the coolant with the foreign debris will flow to the lowest parts of a reactor building, namely to specially arranged sump tanks, from which special pumps can pump the coolant back to various reactor coolant systems.

Destruction of containment equipment leads to saturation of the coolant with waste (debris).

The debris accumulated on the filtration surfaces of the sump tanks must not cause head losses that cause reduction of cavitation margin of safety system pumps below permissible level, deaeration or surge of coolant boiling. The concentration of debris and its fractional composition may not affect heat removal from the reactor plant and performance of the safety system recirculation circuit equipment during the accident and post-accident period.

As stated before, debris may lead to clogging of filtering surfaces of a filter, as a rule, with a slot or grid structure. Considering the necessity of continuous operation of the ECCS system and, therefore, the necessity of continuous operation of its filters, the development of a liquid cleanup system having the capability of self-cleaning of its filtering elements in the passive mode is an important task.

Different engineering solutions were used for resolving the task of cleanup of the filtering surfaces.

A method of regeneration of the filtering element is known (RF patent for invention No. 2329853, published on 27 Jul. 2008), which includes a consistent compression of a gas which the damper is filled with, stopping of filtered liquid, actuation of a damper, redirection of the filtered liquid flow. In this case, an additional filter equipped with a check valve is used. The filtering element is regenerated by reverse feed of the filtered liquid to the regenerated filtering element. The liquid removing a sediment formed in the regenerated filtering element is fed through the pressure release valve to the additional filter where the sediment accumulates. Such a solution allows to clean the filtering surface by arranging a reverse liquid flow, however its disadvantage is the impossibility to clean in the passive mode, i.e. self-cleaning, moreover, arrangement of the back flow in itself implies the stoppage of operation of filtering elements.

The closest technical solution to the proposed one is a device for purification of water from suspended particles (RF patent for invention No. 2471714, published on 10 Sep. 2013), which includes a vertical shell with a feed water input branch pipe and a conical-shaped head with contaminant discharge pipe equipped with a vertical or inclined grid installed with slope 35° or less from the vertical towards the contaminated water, secured to a shell wall with the formation of a clean water compartment, a clean water discharge pipe, arranged in the shell in the clean water compartment, and an aerator comprising of a horizontal pipe, in length equal to the grid installed in the clean water compartment.

Such a solution allows to clean the filtering surface used in the device of suspended particles by directing air bubbles to them. However, its disadvantage is the lack of capability for operation in the passive mode, and no impulse feed of gas-liquid mixture on the filtering surface that conditions the mandatory use of a powerful aerator with external power supply.

The task of this invention is the development of a self-cleaning liquid purification system that enables efficient cleaning of the filtering elements in the passive mode.

The technical result of this invention is improved operation reliability of the liquid purification system through ensuring its capability of self-cleaning in the passive mode, and improved NPP safety through using a system for cleaning of the filtering elements of the sump tanks.

The technical result is attained by the fact that in the known self-cleaning liquid purification system containing a filtration unit with filtering elements and an aerator, the aerator is designed in the form of an intake device located in the source of purified liquid on the liquid-gas boundary and designed with the capability of formation of a gas-liquid mixture when it enters the intake device, wherein the aerator is connected by a vertical downcomer to an accumulation chamber connected to the filtration unit by a hydraulic lock that is designed to be capable of pulse feed of the liquid-gas mixture.

It is rational to design the intake device in the form of a vertical branch pipe with liquid ports located below the liquid level and gas ports arranged above the liquid level during system operation.

It is preferable to arrange the filtering elements in the upper part of the filtration unit, arrange a gas distribution unit with ports below the filtering elements, connected to the hydraulic lock, and arrange a clean liquid discharge pipe below the gas distribution unit.

It is recommended that the hydraulic lock be designed in the form of two vertical pipes interconnected in the lower part, wherein a first vertical pipe is connected in the upper part to the accumulation chamber, and the second one to the gas distribution unit.

It is expedient to design the downcomer with constriction in its central part to ensure acceleration of the gas-liquid mixture flow.

It is rational to design the lower part of filtration unit walls liquid-proof.

The advantages of this invention are improved operation reliability of the liquid purification system through ensuring its capability of self-cleaning in the passive mode, and improved NPP safety through using a system for cleaning of the filtering elements of the sump tanks. The aerator design in the form of the intake device, which is located in the source of purified liquid on the liquid-gas boundary and designed with the capability of formation of the gas-liquid mixture when it enters the intake device, allows to ensure formation of the gas-liquid mixture in the passive operation mode of the liquid purification system, which improves the operation reliability of the system and, consequently, NPP safety. Connection of the aerator by the vertical downcomer to the accumulation chamber connected to the filtration unit with the hydraulic lock that is designed to be capable of pulse feed of the liquid-gas mixture allows to ensure pulse feed of the liquid-gas mixture to the filtration unit, which improves the operation reliability of the liquid purification system through accumulation of a sufficient gas volume in the accumulation chamber with the closed hydraulic lock for subsequent feed of the liquid-gas mixture through the hydraulic lock after a sufficient gas volume has accumulated.

The intake device design in the form of the vertical branch pipe with liquid ports located below the liquid level and gas ports arranged above the liquid level during the system operation ensures formation of the gas-liquid mixture in the passive mode and its feed to the accumulation chamber by gravity, which ensures the gas accumulation in the accumulation chamber and, consequently, the technical result of the claimed invention.

Arrangement of the filtering elements in the upper part of the filtration unit, the gas distribution unit with ports, which is connected to the hydraulic lock, below the filtering elements, and the clean liquid discharge pipe further below allows to ensure cleaning of the filtering elements with surfacing gas bubbles with subsequent clean liquid drain through the discharge pipe, which also ensures the technical result.

The hydraulic lock design in the form of the two vertical pipes interconnected in the lower part, wherein the first vertical pipe is connected in the upper part to the accumulation chamber, and the second one to the gas distribution unit, allows to ensure the gas accumulation in the accumulation chamber with subsequent feed to the gas distribution unit, which ensures the technical result.

The downcomer design with constriction in its central part ensures acceleration of the gas-liquid mixture flow, which enhances the effect of carrying the gas away with the liquid in the intake device, which also allows to ensure the technical result of the claimed device.

Design of the liquid-proof lower part of the filtering unit walls prevents re-entry of debris, which was removed by the gas bubbles from the filtering elements outside the filtration unit, into the filtration unit, which improves the operation reliability of the system and NPP safety in case the system is used in the NPP.

Brief description of figures and drawings. The invention is illustrated by the drawings, where.

The following designations are given in FIGS. 1-5:
1—intake device
2—liquid intake ports
3—gas intake ports
4—lower part of gas intake pipes
downcomer
6—downcomer constriction
7—accumulation chamber
8—hydraulic lock
9—gas distribution unit
bottom orifice of the hydraulic lock
11—filtering elements
12—filtration unit
13—clean fluid discharge pipe
14—lower part of filtration unit walls
liquid level at the upper elevation
15—upper elevation floor
17—liquid level at the upper elevation
18—lower elevation floor
19—gas (air)
liquid
21—gas-liquid mixture
22—liquid with debris
23—gas-liquid mixture with debris The preferred embodiment of the self-cleaning liquid purification system comprises an intake device 1 designed with liquid intake ports 2 and gas intake pipes 3, a gas flow enters a downcomer 5 through their lower part 4. Through the downcomer 5, which has a constriction 6, the intake device 1 is connected to an accumulation chamber 7 connected to a hydraulic lock 8 designed in the form of two vertical pipes interconnected in the lower part by an orifice 10, a first vertical pipe is connected to the accumulation chamber 7 in the upper, while the second vertical pipe is connected to a gas distribution unit 9, in which ports are made to enable feed of a gas-liquid mixture to filtering elements 11 located in a filtration unit 12. The filtration unit 12 is provided with a clean liquid discharge pipe 13, wherein the lower part of filtration unit walls 14 is designed liquid-proof in the preferred embodiment of the invention.

Operation of the self-cleaning liquid purification system can be illustrated with an example of filtering devices of a sump tank of an ECCS system of a nuclear power plant.

Figure 1:
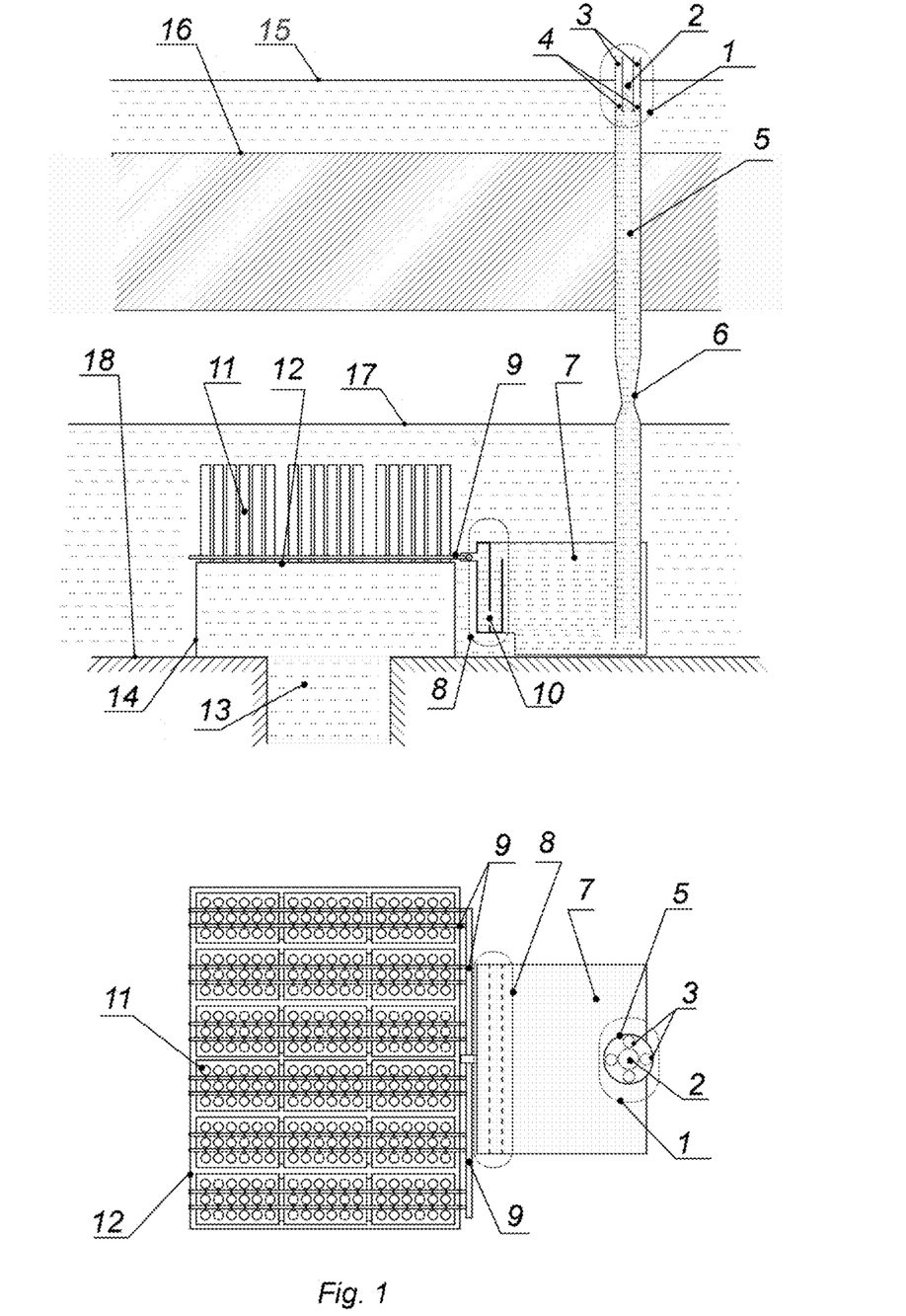
FIG. 1 shows the overall view of the self-cleaning liquid purification system in the preferable embodiment in horizontal and vertical planes.

In this case, as shown in FIG. 1, after a loss of coolant accident the liquid to be filtered (boric acid solution) is located on an upper elevation floor 16, where the intake device 1 of the system is located, and the sump tank with the filtering elements 11 of either trench or grid structure is located on a lower elevation floor 18. The downcomer 5 passes through the upper elevation floor.

Figure 2:
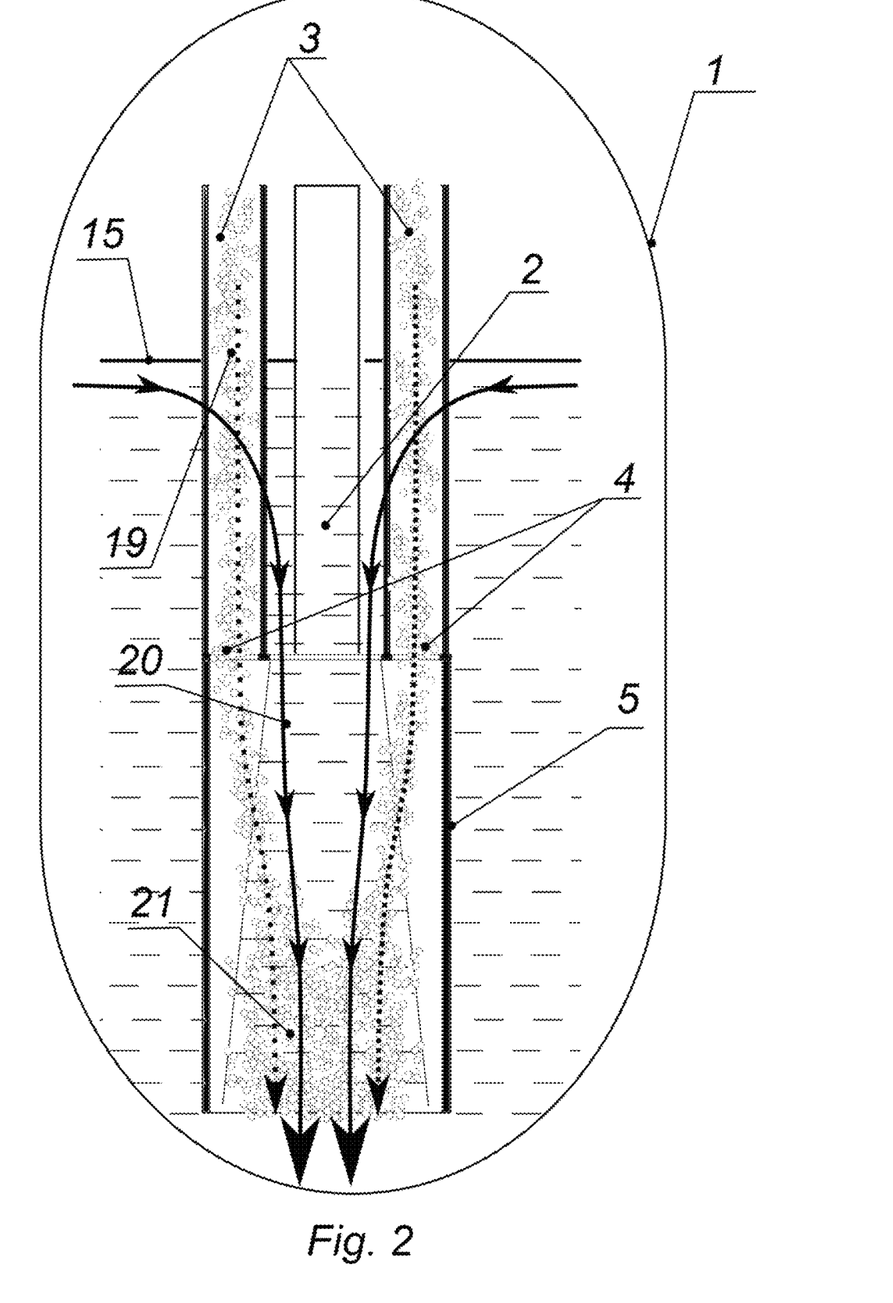
FIG. 2 shows the intake in the preferable embodiment.

The intake device 1, where the water-air mixture is formed in the downcomer 5, is disclosed in FIG. 2. The liquid enters the downcomer 5 through the port 2 located below a liquid level 17. A moving liquid jet 20 interacts with a surrounding air and draws it in to the liquid medium, thus forming a gas-liquid mixture 21. An air 19 is fed through the pipes 3, which upper part is located above the liquid level 17. The lower part 4 of the pipes 3 is connected to the inner part of the downcomer 5. The gas-liquid mixture 21 runs down the downcomer 5 by gravity.

As calculations show, in this case the approximate liquid flow rate at the intake of the downcomer 1 in this specific example is 0.009 m3/s. The flow rate of air drawn into the jet is 0.0063 . . . 0.088 m3/s (according to data from different sources). The mixture flow rate is 0.015 m3/s; the mixture flow velocity in the downcomer 1 is 0.47 m/s. The said velocity is higher than the ascending speed of air bubbles, so the air will be carried down the downcomer 5 with the liquid flow.

Figure 3:
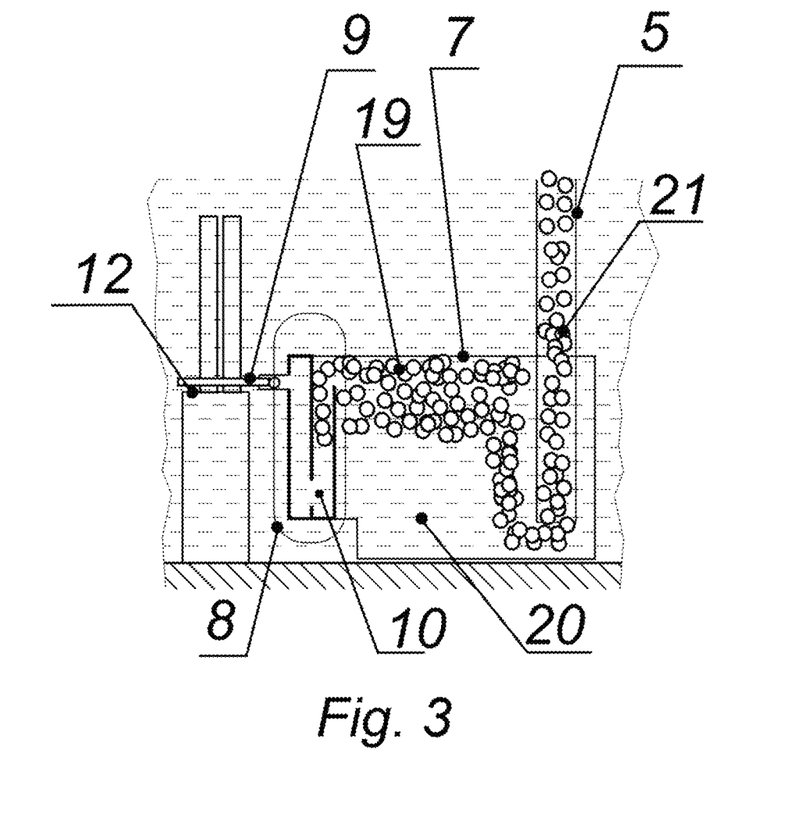
FIG. 3 shows the accumulation chamber in the preferable embodiment.

The design of the accumulation chamber 7 is given in FIG. 3. Upon reaching the bottom end of the downcomer 5, the gas-liquid mixture 21 enters the accumulation chamber 7. At the outlet of the chamber 7 the cross-section for flow dispersion considerably increases that leads to reduction of its velocity. The air bubbles 19 manage to ascend above the outlet gap and accumulate in the upper part of the accumulation chamber 7.

As calculations show, the approximate mixture flow velocity at the inlet of the accumulation chamber 5 is 0.47 m/s. The mixture flow velocity at the outlet of the accumulation chamber 5 is 0.05 m/s.

The air is accumulated in the accumulation chamber 7 to the level of the bottom orifice 10. The hydraulic lock 8 opens at this time, and air begins to enter the gas distribution unit 9. The air level in the accumulation chamber 7 begins to fall. When the air level reaches the level of the gas distribution unit 9, water begins to enter the hydraulic lock 8. When the water level covers the bottom orifice 10, the hydraulic lock 8 is blocked, and the air begins to accumulate in the accumulation chamber 7. The cycle is repeated. The operation principle of the hydraulic lock is given in FIG. 4.

Figure 4:
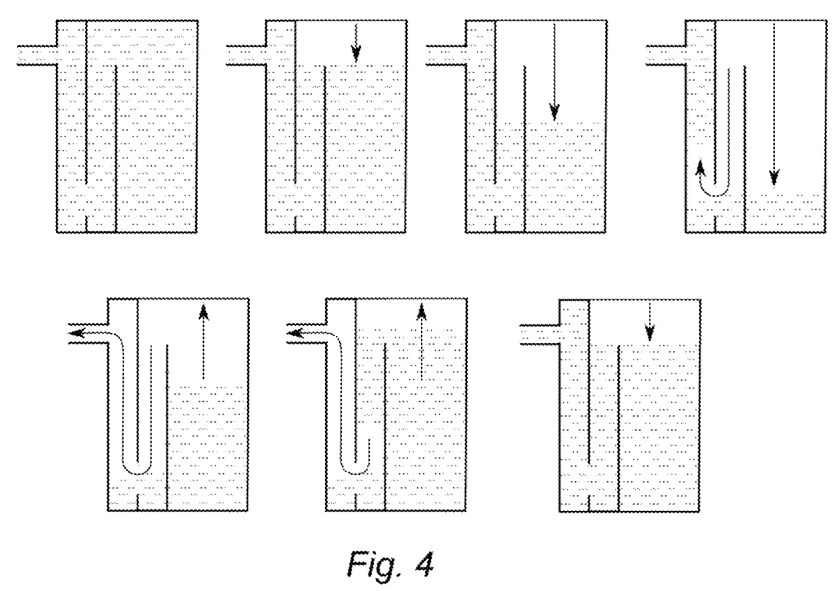
FIG. 4 shows the operation principle of the hydraulic lock in the preferable embodiment.

As calculations show, a condition of cyclic operation of a separation chamber is that the air flow into the gas distribution unit 7 exceeds the air feed from the gas-liquid mixture.

The operating air volume in the accumulation chamber 7 is 0.650 m3.

The air accumulation cycle time in the accumulation chamber is 100 s.

The maximum relative air pressure in the accumulation chamber 5 is 2.66-1.98 m H2O.

The average air flow rate is 20/s. The air bleeding cycle time is 15 s.

The air flow rate during bleeding is 0.044 m3/s (seven times as big as that the air feed from the downcomer 5; thus, the condition of cyclic operation is met).

The gas distribution unit 9 inside the sump tank is equipped with outlet ports. A stream of air bubbles is formed along the filtering elements 11 as shown in FIG. 5.

The classic tangential flow filtration scheme provides for creating a tangential flow using an external circulating pump. In this case, the sum of operating and circulating flows must exceed the operating flow more than 10-fold, which requires installation of an additional submersible pump of several hundred kW. Furthermore, such pump must ensure prolonged operation with polluted water that contains fibre impurities.

Bubbles of gas (air), a substance in another phase state, are used in the considered filtration scheme given in FIG. 4 for creating the liquid movement along the filtering surface. The air is fed between the filtering elements 11 along their filtering surface. The liquid movement is formed at the time of passage of any section of the filtering surface by a bubble. Thus, the filtering surface is cleaned not simultaneously all over the surface, but discretely at individual sections. The cleaning cycle of the entire filtering surface takes a certain time interval. The air bubbles' flow velocity along the filtering surface does not drop as they surface; on the contrary, it may accelerate due to enlargement of bubbles caused by their merging.

Figure 5:
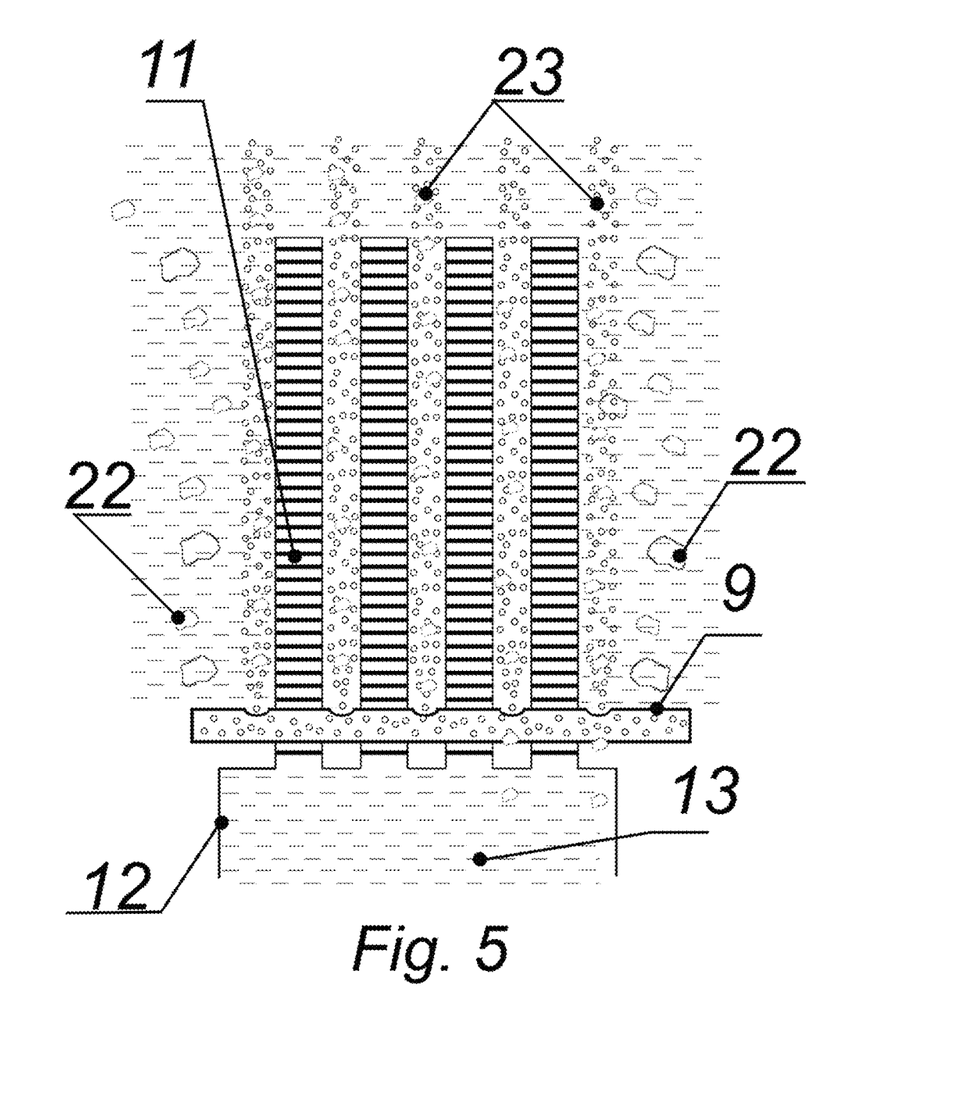
FIG. 5 shows the view of the filtering elements cleaned by a water-air mixture in the preferable embodiment.

As result of the system operation, the gas bubbles 19 carry a debris 22 stuck in the filtering elements 11 to the top, as shown in FIG. 5, wherein a purified liquid is removed outside the system, where it can be used for any need, through the clean liquid discharge pipe 13. At the same time, a substantial part of the debris 22 carried with the gas bubbles settles at the side of the filtration unit and no longer reaches the filtering elements 11 in the preferred embodiment, since the lower part of the filtration unit is designed liquid-proof. At the same time, the pulse principle of gas-liquid mixture feed has a positive impact on the liquid purification quality, since it allows to accumulate a significant air volume before the feed, and also to ensure gradual settlement of the debris, which was carried away from the filtering elements 11, outside the filtration unit.

INDUSTRIAL APPLICABILITY

The emergency cooling system of a nuclear power plant may be used in nuclear power plants for cleaning the filtering elements of the sump tanks of the ECCS system, and in any submersible pump systems used in any s of activity.

Thus, the invention can be formulated as follows.

The invention claimed is:

1. A self-cleaning ECCS filter system, comprising:
a vertically extending downcomer having a top end and a bottom end;
an aerator intake partially submerged in a liquid and configured to introduce a gas-liquid mixture to the top end of the downcomer;
an accumulation chamber located in the sump tank, wherein the bottom end of the downcomer is positioned in the accumulation chamber and is configured to introduce the gas-liquid mixture into the accumulation chamber and the accumulation chamber;
a hydraulic lock positioned in the accumulation chamber; and
a filtration unit comprising filtering elements and a clean liquid discharge pipe located in the sump tank,
wherein the hydraulic lock is configured to cyclically pass air then water from the accumulation tank to the filtration unit through a distribution unit.

2. The system according to claim 1, wherein the aerator intake comprises a vertical pipe having water intake holes at a bottom end and air intake holes at a top end, the water intake holes submerged in the liquid and the air intake holes located above the liquid.

3. The system according to claim 1, wherein the filtering elements are located in an upper portion of the filtration unit, the distribution unit is connected to the filtration unit below the filtering elements, and the clean liquid discharge pipe is below the distribution unit.

4. The system according to claim 1, wherein the hydraulic lock comprises a first vertical pipe and a second vertical pipe fluidly connected to each other at a lower end of the two pipes, wherein an upper end of the first pipe is fluidly connected to the accumulation chamber, and an upper end of the second pipe is fluidly connected with the distribution unit.

5. The system according to claim 1, wherein a central portion of the downcomer has a smaller cross section than a remainder of the downcomer, the central portion of the downcomer configured to accelerate the gas-liquid mixture as is travels through the downcomer from the aerator intake to the accumulation chamber.

* * * * *